Nov. 19, 1963    J. H. GORNDT ETAL    3,111,172
ROTOR HEAD

Filed June 21, 1962    2 Sheets-Sheet 1

INVENTORS
John H. Gorndt
BY Robert R. Peterson
Warren E. Schmidt
Ralph Hammar
Attorney Nov. 19, 1963  J. H. GORNDT ETAL  3,111,172
ROTOR HEAD Filed June 21, 1962  2 Sheets-Sheet 2

INVENTOR.
John H. Gorndt
BY Robert R. Peterson
Warren L. Schmidt

Ralph Hammar
attorney

3,111,172
ROTOR HEAD
John H. Gorndt, Robert R. Peterson, and Warren E. Schmidt, Erie, Pa., assignors to Lord Manufacturing Company, Erie, Pa., a corporation of Pennsylvania
Filed June 21, 1962, Ser. No. 204,117
2 Claims. (Cl. 170—160.51)

In application Serial No. 142,223 there is shown a rotor head for helicopters, autogyros and the like in which elastomeric joints perform the functions of the blade thrust bearings, the damper and the drag and flapping hinges and associated hardware. This invention has the further improvement of elastomeric joints to limit or control bodily movement of the blades transverse to the longitudinal axes.

Figure 1:
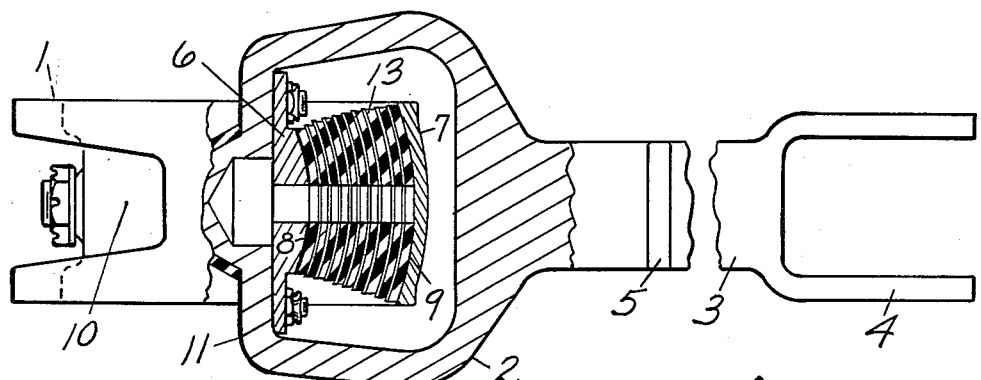
Figure 2:
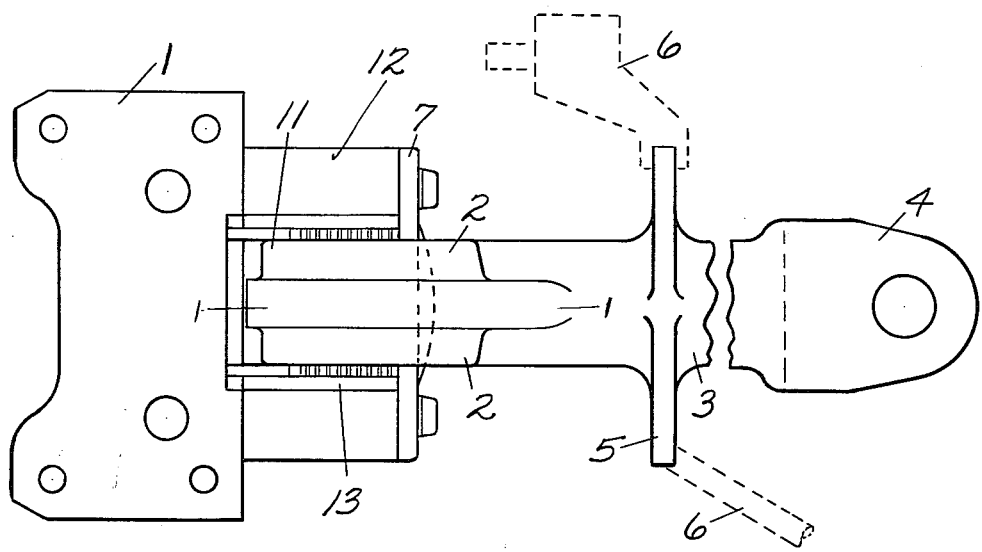
Figure 3:
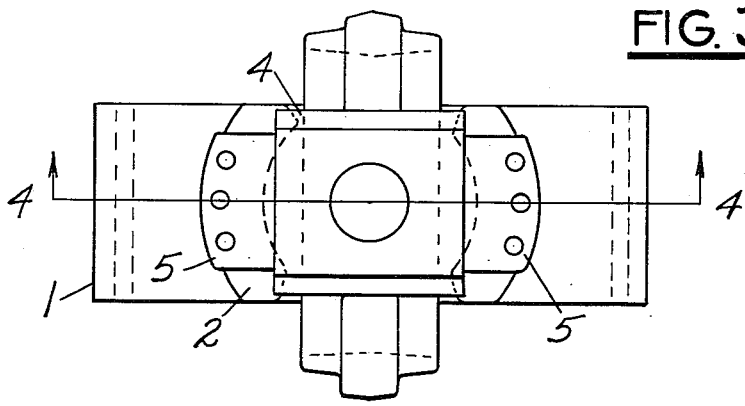
Figure 4:
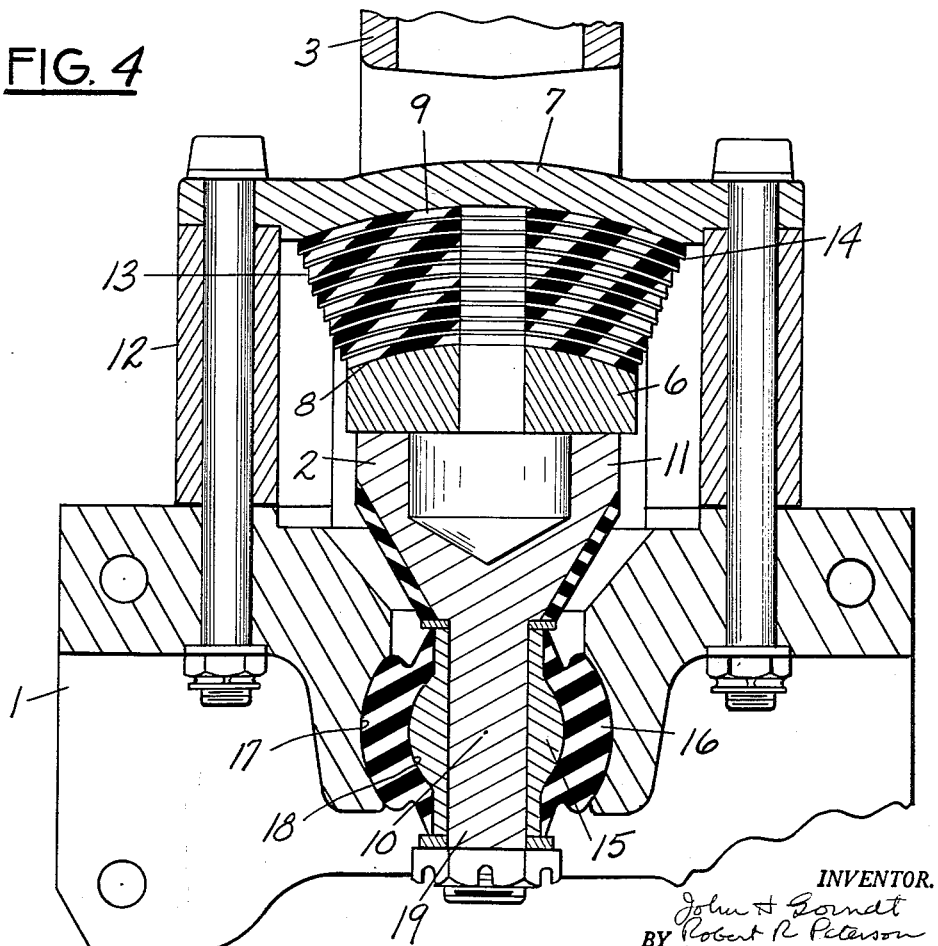

In the drawing, FIG. 1 is an elevation of a blade drive arm in section on line 1—1 of FIG. 2. FIG. 2 is a top plan view of the drive arm, FIG. 3 is an end view of the drive arm, and FIG. 4 is a section on line 4—4 of FIG. 3.

The drive arm has a bracket 1 for rigid attachment to a helicopter rotor head and a yoke 2 having a shank 3 formed at its outer end 4 for rigid attachment to a blade. At a central part of the shank 3 are lugs 5 for connection to the mechanism 6 for rotating the blade about its axis to vary the pitch. In addition to rotation about the axis of the blade, each of the blades has a flapping motion about an axis in a horizontal plane through the associated arm and a lead-lag or drag motion about an axis in a vertical plane through the arm. There are also centrifugal forces and forces tending to move the blade bodily in horizontal and vertical directions transverse to the axis of the blade.

The blade thrusts and operational movements are accommodated by two elastomeric joints in each drive arm. One of the joints comprises inner and outer members 6 and 7 arranged at right angles to each other and having opposed arcuate surfaces 8 and 9 centered at 10. The inner member 6 is bolted to the base 11 of the yoke 2. The outer member 7 is bolted to the bracket 1 with intermediate spacers 12 arranged between the ends of the member and the bracket. A body 13 of suitable elastomer is arranged between and bonded to the arcuate surfaces 8 and 9. Spaced throughout the body are a plurality of arcuate metal plates or shims 14 which prevent bulging of the elastomer under radial load, thereby making the joint very stiff in a radial direction or along the longitudinal axis of the blade so as to withstand the huge centrifugal forces of the rotating blade. The shims 14 do not interfere with the torsional stiffness of the elastomer so that the rotational movements of the blade about its axis required to change the pitch of the blade are easily effected. The shims have only slight effect upon the cocking stiffness of the body required to accommodate the lead-lag and flapping modes of the blade. As an example of the order of magnitude of stiffness for the various directions, the body 13 might have a stiffness of 200,000 pounds per inch in a radial direction so as to be very stiff so far as the radial loads were concerned, while at the same time having a torsional or pitch spring rate of 1200 inch pounds per radian and a cocking or lead-lag spring rate of 10,000 inch pounds per radian. With stiffnesses of this order of magnitude, the body 13 takes the place of the thrust bearings, the drag and flapping hinges and associated hardware and the damper. If greater radial stiffness is required, it can be had by merely increasing the number of shims 14 and without affecting the torsional or cocking stiffness. The effect of the shims 14 in increasing the radial stiffness is well understood. The larger number of shims reduces the area in which rubber can bulge under radial or compression load and the resultant stiffness in the radial direction accordingly more closely approaches the bulk modulus of the elastomer as the number of shims is increased. The shims need not be metal. Any non extensible material may be used, for example glass fiber reinforced plastic, etc.

In addition, there are forces tending to displace the blade bodily transverse to its axis. These forces are resisted by a joint comprising a center sleeve 15 to the outer surface of which is bonded a body 16 of suitable elastomer. The body 16 is pressed into a smaller diameter opening 17 in the bracket 1, thereby providing a friction grip which solidly anchors the body 16 to the bracket. The surface 16 on the bracket and the opposed surface 18 on the sleeve are shown as generally spherical centered about point 10. The surfaces 17 and 18 could have other shapes. For example, the surfaces 17 and 18 could be concentric cylindrical surfaces such as common in tube form mountings and joints. The sleeve 15 is bolted to a stem or spindle extension 19 on the yoke 2. The body 16 is quite soft for forces along the axis of the blade and does not contribute to carrying the centrifugal blade loads. The body 16 also does not affect the torsional spring rate required to accommodate the blade pitch or the cocking spring rate to accommodate the lead-lag or drag motion. However, the body is quite stiff in all radial directions perpendicular to the axis of the blade and, therefore, firmly resists all bodily translation of the blade in any direction transverse to its axis. The radial stiffness could be increased, if desired, by the shim technique used in the body 13. From one aspect, it could be considered that the body 16 performs the function of a guide bearing holding the blade on its axis.

The elastomeric joints eliminate troublesome lubrication and service problems associated with the operational loads and motion of the blades. The joints also eliminate the need for a damper because the elastomeric bodies can be selected to have internal friction sufficient to provide the necessary damping. The joints also eliminate a great deal of the hardware associated with the operational movements of the blades and thereby simplify the construction as well as improving the service life.

What is claimed as new is:

1. In a rotor head having a drive arm, a yoke having a shank extending radially outward for connection to the inner end of a radially extending blade, elastomeric joint means between the yoke and the arm which has its axis of greatest stiffness in a radial direction along the axis of the blade and which is soft in torsion about the axis of the blade and less soft in torsion about axes perpendicular to the axis of the blade, another elastomeric joint means between the yoke and the arm spaced radially inward from the first joint means, said other joint means having its greatest stiffness in directions radial to the axis of the blade and being soft in torsion about the axis of the blade whereby the joints resist bodily movement of the blade both along and transverse to the axis of the blade without interfering with angular movement of the blade about its axis for varying the pitch or angular movement of the blade about axes perpendicular to the axis of the blade for lead-lag motion.

2. A rotor head drive arm having a first yoke, a second yoke radially outward of the first yoke for connection to a radially extending blade, said yokes being linked through each other and lying respectively in intersecting planes, said first yoke having a surface presented radially inward, said second yoke having a surface presented radially outward in opposed relation to said first surface, a body of elastomer sandwiched between and bonded to said opposed surfaces and having means for preventing bulging of the elastomer under compression loads, a stem fixed to the second yoke and projecting radially inward, a tubular body of elastomer surrounding the stem, means securing the inner surface of said tubular body to the stem and the outer surface of the tubular body to the first yoke, said tubular body being relatively stiff radially as compared to torsion whereby the tubular body resists bodily movement of the blade transverse to the radial without interfering with the angular movement of the blade about its axis for varying the pitch.

References Cited in the file of this patent

UNITED STATES PATENTS

| | | |
|---|---|---|
| 2,151,216 | Larson | Mar. 21, 1939 |
| 2,319,335 | Martinotti | May 18, 1943 |
| 2,995,907 | Orain | Aug. 15, 1961 |

FOREIGN PATENTS

| | | |
|---|---|---|
| 934,336 | France | Jan. 10, 1948 |